United States Patent
Lehmann

(10) Patent No.: US 10,151,769 B2
(45) Date of Patent: Dec. 11, 2018

(54) MEASURING DEVICE AND UNIT HAVING SUCH A MEASURING DEVICE

(71) Applicant: Rolls-Royce Deutschland Ltd & Co KG, Blankenfelde-Mahlow (DE)

(72) Inventor: Martin Lehmann, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 130 days.

(21) Appl. No.: 15/170,538

(22) Filed: Jun. 1, 2016

(65) Prior Publication Data
US 2016/0363608 A1    Dec. 15, 2016

(30) Foreign Application Priority Data
Jun. 12, 2015 (DE) .......... 10 2015 109 416

(51) Int. Cl.
| | | |
|---|---|---|
| G01P 5/165 | (2006.01) | |
| G01P 5/00 | (2006.01) | |
| G01F 1/34 | (2006.01) | |
| G01F 1/46 | (2006.01) | |
| G01L 13/00 | (2006.01) | |
| G01P 13/02 | (2006.01) | |

(52) U.S. Cl.
CPC .......... *G01P 5/165* (2013.01); *G01F 1/34* (2013.01); *G01F 1/46* (2013.01); *G01L 13/00* (2013.01); *G01P 5/00* (2013.01); *G01P 13/025* (2013.01)

(58) Field of Classification Search
CPC .......... G01P 13/025; G01P 5/165; G01P 5/00; G01F 1/34; G01F 1/46; G01L 13/00
USPC .......... 73/861.65–861.69, 170.05–170.15; 374/141–144
See application file for complete search history.

(56) References Cited

U.S. PATENT DOCUMENTS

| | | | | |
|---|---|---|---|---|
| 2,780,421 A | * | 2/1957 | Herr | B65H 23/02 242/480.8 |
| 2,791,121 A | * | 5/1957 | Morrill | H02K 15/085 242/432.4 |
| 3,785,212 A | * | 1/1974 | Eminger | H02K 15/085 242/432.4 |
| 4,016,768 A | * | 4/1977 | Mashburn | G01D 11/30 74/23 |

(Continued)

FOREIGN PATENT DOCUMENTS

| | | |
|---|---|---|
| DE | 69108135 T2 | 10/1995 |
| DE | 102004016033 A1 | 10/2005 |

(Continued)

OTHER PUBLICATIONS

European Search Report dated Dec. 1, 2016 for counterpart European Application No. 16169622.4.

(Continued)

*Primary Examiner* — Robert R Raevis
(74) *Attorney, Agent, or Firm* — Shuttleworth & Ingersoll, PLC; Timothy Klima

(57) ABSTRACT

A measuring device having at least one at least approximately tubular probe device, by means of which an impact pressure, a total pressure or a dynamic pressure of a flow can be determined, and which is designed movable at least between a first operating state and a second operating state, where the probe device can be moved by an actuating unit in a controlled manner between the first operating state and the second operating state and held in said states.

20 Claims, 3 Drawing Sheets

(56) References Cited

U.S. PATENT DOCUMENTS

Figure 1:
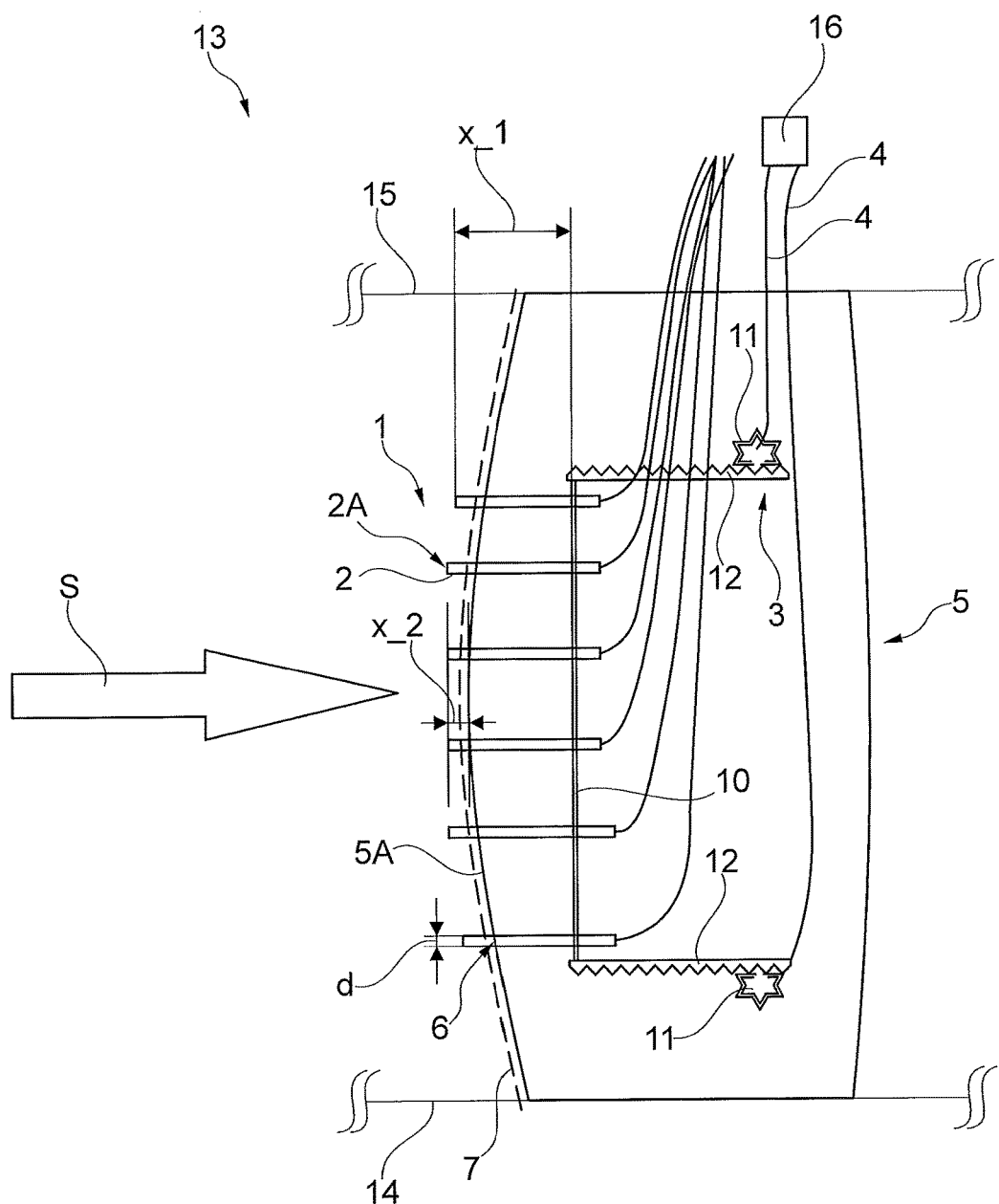

| | | | | |
|---|---|---|---|---|
| 4,096,744 | A * | 6/1978 | De Leo | G01C 5/06 73/180 |
| 4,615,213 | A * | 10/1986 | Hagen | G01L 19/0007 73/180 |
| 4,920,808 | A * | 5/1990 | Sommer | G01P 5/14 73/170.14 |
| 4,981,038 | A * | 1/1991 | Torres | G01F 1/46 73/182 |
| 5,257,536 | A * | 11/1993 | Beigbeder | G01P 5/16 73/170.02 |
| 5,337,602 | A * | 8/1994 | Gibson | G01P 5/165 73/182 |
| 5,383,355 | A * | 1/1995 | Baleras | F01D 17/02 73/112.01 |
| 5,440,217 | A * | 8/1995 | Traina | G01F 1/002 318/51 |
| 5,442,958 | A * | 8/1995 | Hagen | G01P 5/165 73/170.02 |
| 6,883,389 | B2 * | 4/2005 | Eldridge | G01F 1/46 73/861.65 |
| 7,377,159 | B2 * | 5/2008 | Thomas | G01P 5/00 73/170.02 |
| 7,962,307 | B2 * | 6/2011 | West | F01D 21/003 702/138 |
| 8,408,082 | B2 * | 4/2013 | Dahler | G01N 1/2247 73/863.01 |
| 8,806,926 | B2 * | 8/2014 | Boisseleau | G01F 1/46 73/114.31 |
| 9,296,468 | B1 * | 3/2016 | Harvey | B64C 3/40 |
| 2009/0031801 | A1 * | 2/2009 | Martindale | F01D 21/003 73/431 |
| 2014/0090457 | A1 * | 4/2014 | Snider | G01L 23/24 73/112.01 |

FOREIGN PATENT DOCUMENTS

| | | |
|---|---|---|
| EP | 0266376 A1 | 5/1988 |
| EP | 0620419 A1 | 10/1994 |
| EP | 2221593 A2 | 8/2010 |
| GB | 1485759 A | 9/1977 |

OTHER PUBLICATIONS

German Search Report dated Feb. 8, 2016 from counterpart German App No. 10 2015 109 416.9.

* cited by examiner

MEASURING DEVICE AND UNIT HAVING SUCH A MEASURING DEVICE

This application claims priority to German Patent Application DE102015109416.9 filed Jun. 12, 2015, the entirety of which is incorporated by reference herein.

This invention relates to a measuring device having at least one at least approximately tubular probe device and a unit, in particular a fluid-flow machine, according to the type defined in more detail in the present disclosure.

In fluid-flow machines or aircraft engines, measuring devices are used, among others, in the bypass flow area between a fan and so-called flow-guiding devices or OGVs (outlet guide vanes) for impact pressure measurement and/or for determining the dynamic pressure. OGVs are stator vanes downstream of the fan in the flow direction and arranged in the bypass flow of the aircraft engine; they are arranged substantially in the radial direction passing through the flow cross-section of the bypass flow area and are connected to an end area with components limiting the bypass flow areas.

Devices known from actual practice for measuring impact pressures in the area of flow cross-sections of jet engines are usually arranged at an outer area of such flow-guiding devices. Measuring devices arranged in these areas of jet engines have however a detrimental effect on the test results of acoustic test routines by means of which an acoustic behaviour of jet engines is determined. This results from the fact that the measuring devices arranged in the outer area of the flow-guiding devices affect the flow in the flow cross-section of a jet engine and hence falsify measurement results during an acoustic test.

To prevent an acoustic test from being affected, for example, the measuring devices are therefore removed before every acoustic test. Several consecutive impact pressure measurements and acoustic tests therefore cause long setup times, which increase the development costs for jet engines to an unwelcome extent.

A device for measuring a static pressure in a combustion chamber is known from EP 2 221 593 B1. A probe device of the measuring device is designed movable substantially translationally or in the axial direction of the measuring device relative to a casing at least partially surrounding the probe device. Furthermore, a spring force of a spring device acting in the direction of a first operating state of the probe device is applied to the probe device, in which operating state the probe device protrudes further out of the casing than is the case in a second operating state moved against the spring device.

Depending on the static pressure prevailing in the combustion chamber in each case, a more or less large setting force opposing the spring force of the spring device and resulting from the static pressure is applied to the probe device. If this pressure-dependent setting force exceeds the spring force of the spring device applied to the probe device, said probe device is moved relative to the casing and against the spring force by the applied static pressure and increasingly received by the casing. The probe device is here moved in the axial direction against the spring until a stop on the casing side prevents any further axial movement of the probe device.

The respective static pressure prevailing in the combustion chamber thus determines the current position of the probe device. Impact pressure measurements can be conducted to the required extent over the entire operating range of an aircraft engine only within limits using the known measuring device, since pressure fluctuations of the impact pressure cause operating state changes in the area of the measuring device and therefore affect the measurement results to an extent that cannot be reconstructed.

The object underlying the invention is on the one hand to provide a measuring device for determining an operating quantity, in particular an impact pressure, by means of which units, in particular fluid-flow machines such as aircraft engines and the like, can be manufactured cost-effectively, and on the other hand to provide a unit in the area of which impact pressure measurements and acoustic tests can be performed to the required extent with short setup times.

It is a particular object of the present invention to provide solution to the above problematics by a measuring device and a unit in accordance with the features of patent Claims 1 and 7, respectively.

The measuring device in accordance with the invention includes at least one at least approximately tubular probe device, by means of which an operating quantity of a flow can be determined, in particular an impact pressure, a total pressure, a dynamic pressure, a temperature and/or dynamic pressure fluctuations, and which is designed movable at least between a first operating state and a second operating state.

In accordance with the invention, the probe device can be moved by an actuating unit in a controlled manner between the first operating state and the second operating state and held in said states.

This advantageously offers the possibility of moving the probe device, regardless of the ambient conditions of the measuring device, at least between two defined positions translationally and/or rotationally about a pivot point in the space or in a plane and to hold it in said positions. The impact pressure measurement can then be conducted in a first position of the probe device. In the at least second position of the probe device, the latter is, with an appropriate arrangement of the measuring device, arranged relative to the flow cross-section guiding the flow such that the flow through the probe device is not affected and the acoustic test supplies unfalsified measurement results.

The measuring device in accordance with the invention offers here the particular advantage that an acoustic test can seamlessly follow an impact pressure measurement in the area of an aircraft engine, or an impact pressure measurement can follow an acoustic test, without fitting or removal of a known measuring device, since the probe device must here only be actively moved between the two operating states or positions and held in these states. As a result, successive acoustic tests and impact pressure measurements can be performed cost-effectively to the required extent with short setup times.

In an advantageous embodiment of the measuring device in accordance with the invention, the at least one probe device is designed movable in the axial direction by the actuating unit, and a distance between an end area facing the flow of the at least one probe device and the actuating unit is greater in the first operating state than when the probe device is in the second operating state, so that the probe device can be advantageously arranged with its end area facing the flow in different areas of said flow or can be moved into or moved out of these.

The probe device is designed as a Pitot probe in a simply designed and cost-effective embodiment of the device in accordance with the invention.

If the probe device is a Kiel probe, the measuring precision during determination of the impact pressure of a flow is dependent on the inflow angle of the flow in the area of the probe device to a lesser extent than is the case with other probe devices for determining an impact pressure.

The probe device is, in further advantageous embodiments of the measuring device in accordance with the invention, moved fluidically, mechanically and/or electrically between the first operating state and the second operating state and held in said states. A fluidic actuation is here characterized by a low installation space requirement and at the same time by low maintenance effort, while an electrical actuation of the probe device can be performed with low wear.

If the probe device is connected to a control unit via a connecting means, the control unit can be arranged in a simple design outside a flow cross-section in the area of which the impact pressure measurement is performed.

The unit in accordance with the invention, in particular a fluid-flow machine, has at least one component limiting a flow cross-section and at least one flow-guiding device moving into the flow cross-section substantially in the radial direction.

At least one measuring device designed in accordance with the invention is arranged at least partially in the interior of the flow-guiding device, preventing the measuring device from affecting the flow in simple manner.

In addition, in the first operating state that end of the sensor device facing the flow is, with a corresponding arrangement of the measuring device in the flow-guiding device, arranged projecting into the flow in such a way that an impact pressure measurement can be performed with the measuring device. In the second operating state, that end of the sensor device facing the flow can then be positioned relative to the flow such that the flow through the sensor device and the measuring device is almost unaffected, which is particularly advantageous for acoustic tests during which the measuring device is not needed.

If at least one opening passing through an outer area of the flow-guiding device and corresponding to the probe device is provided, through which opening the probe device can be moved into the first operating state and into the second operating state, the flow inside the flow cross-section is only affected by the measuring device to a minor extent during an impact pressure measurement and almost not affected at all during an acoustic test.

The diameter of the opening is, in an advantageous development of the device in accordance with the invention, equal to or smaller than a defined value at which the fluid flowing around the flow-guiding device is not affected by the opening in the flow-guiding device. This is the case in particular when despite the opening in the flow-guiding device, a corresponding boundary layer forms on the outer circumference of the flow-guiding device and the flow adjacent to it is unaffected by the opening in the area of the flow-guiding device.

The end area of the probe device facing the flow in the flow cross-section protrudes, in an advantageous embodiment of the device in accordance with the invention, in the first operating state of the probe device beyond an outer area of the flow-guiding device by a defined distance value at which an impact pressure measurement can be conducted. In contrast to this, the end area of the probe device facing the flow in the flow cross-section has in the second operating state of the probe device, a position relative to the outer or front area of the flow-guiding device facing the flow in which the flow is not affected by the probe device.

If at least one measuring device is provided with several probe devices, which are arranged running at least approximately parallel to one another and at a distance from one another over the height of the flow-guiding device, a flow field along the flow-guiding device, preferably along a leading edge of said flow-guiding device, can be recorded, and an impact pressure profile can be determined to the required extent over the height of the flow-guiding device or in the radial direction of the flow cross-section.

To determine the individual values measured by the probe devices from a certain area of the flow field upstream of the flow-guiding device, and hence the measurement results obtained in each case in an appropriately comparable and precise manner, the end areas of the probe devices facing the flow in the flow cross-section protrude, in a further advantageous embodiment of the device in accordance with the invention, in the first operating state beyond the outer area of the flow-guiding device by an at least approximately identical distance value.

If the unit is an aircraft engine and the flow-guiding device is arranged in a bypass flow of the aircraft engine, impact pressure measurements and acoustic tests of the aircraft engine can be conducted to the required extent with little effort and cost-effectively.

Both the features stated in the patent Claims and the features stated in the following exemplary embodiments of the subject matter in accordance with the invention are each suitable, singly or in any combination with one another, to develop the subject matter of the invention.

Further advantages and advantageous embodiments of the subject matter in accordance with the invention become apparent from the patent Claims and the exemplary embodiment described in principle in the following with reference to the accompanying drawings.

Figure 2:
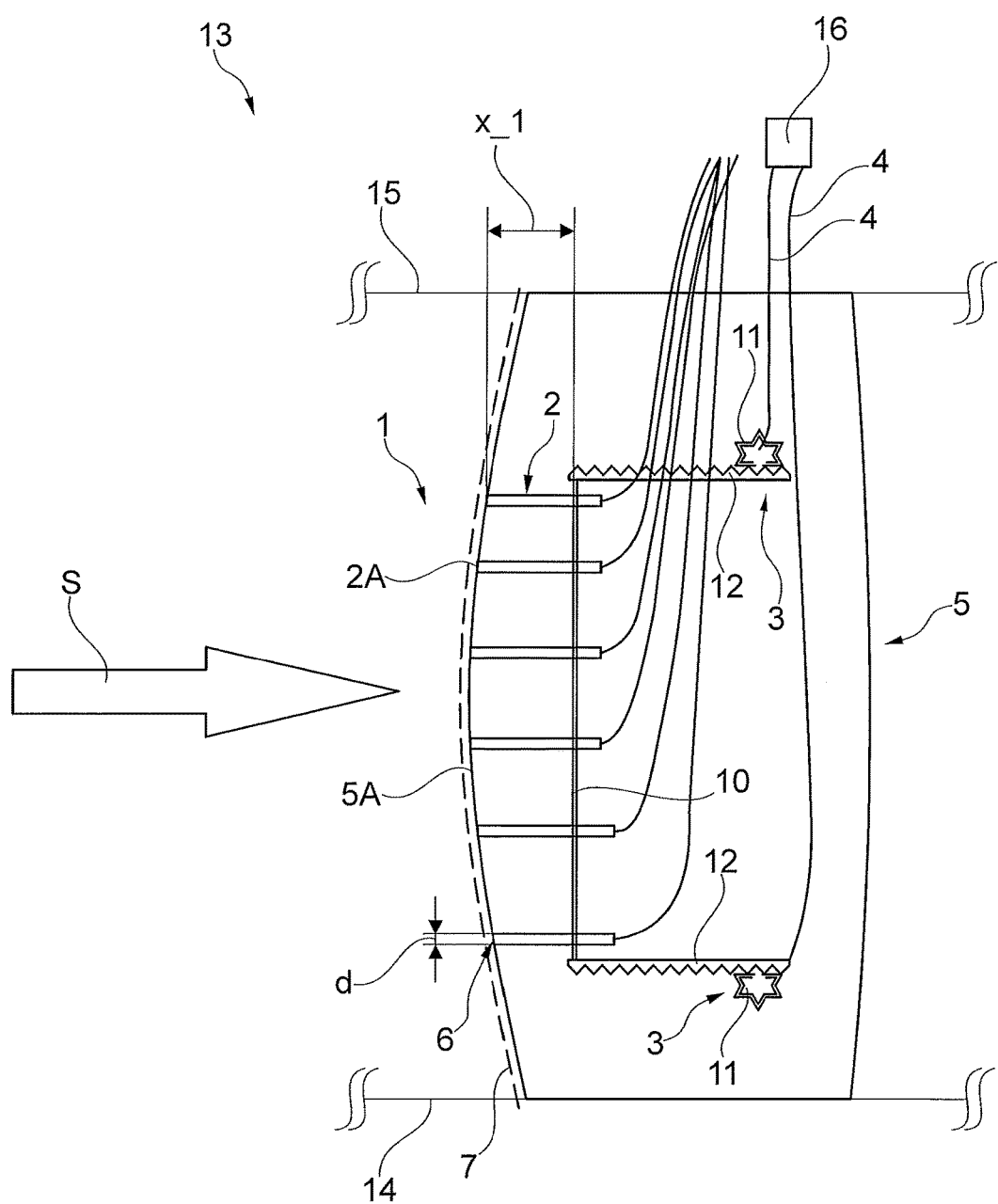
Figure 3:
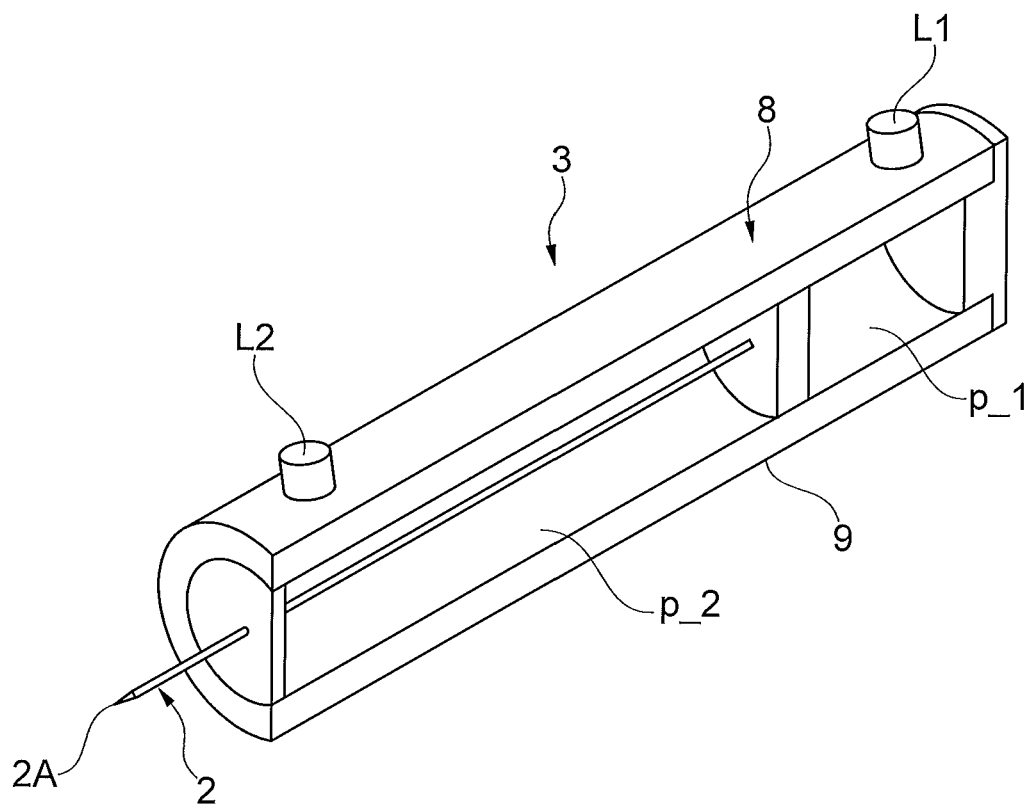

In the drawings,

FIG. 1 shows a schematic representation of a flow-guiding device with a measuring device arranged in the interior of said flow-guiding device and a probe device in the first operating state, FIG. 2 shows a schematic representation of a flow-guiding device with the measuring device arranged in the interior of said flow-guiding device and a probe device in the second operating state, and FIG. 3 shows an actuating unit of the measuring device in accordance with the present invention, said unit being designed as a piston-cylinder unit and by means of which a probe device can be moved in a controlled manner between the first operating state and the second operating state and held in said states.

FIG. 1 and FIG. 2 each show areas of a unit 13 representing an aircraft engine designed with components 14, 15 limiting a flow cross-section. A bypass flow of the aircraft engine 13 is routed here inside the flow cross-section of said aircraft engine 13. The component 15 here corresponds to an outer engine casing, while the component 14 separates the bypass flow area from an inner engine area.

Several flow-guiding devices 5 extend between the outer component 15 and the inner component 14 in a manner known per se, with FIG. 1 and FIG. 2 each showing one device. The flow-guiding device 5 corresponds to a stator vane or a so-called OGV (outlet guide vane) which is arranged inside the aircraft engine 1, in the bypass flow area of said aircraft engine 1, downstream of a fan (not shown in detail) in the flow direction, to transform the flow in the bypass flow area downstream of the fan into a preferably laminar flow with the lowest possible losses.

In order that upstream of the flow-guiding devices 5 an operating quantity such as an impact pressure, a total pressure and/or a dynamic pressure can be determined, one or more measuring devices 1 in this case with several probe devices 2 are arranged at least in the interior of one of the flow-guiding devices 5. In the exemplary embodiment of the measuring device 1 shown in FIG. 1 and FIG. 2, said measuring device 1 includes six probe devices 2 that are at a distance from one another over the height of the flow cross-section of the bypass flow area of the aircraft engine 13 and are arranged at least approximately parallel to one another inside the flow-guiding device 5.

The probe devices 2 are each designed at least approximately identical and tubular and are fastened to a probe device carrier 10. The probe devices 2 are designed movable, using the probe device carrier 10, between a first operating state and a second operating state and can be held in said states. The probe devices 2 are here designed translationally or axially movable in the flow direction of the flow S in the flow cross-section of the bypass flow area of the aircraft engine 1.

An actuating unit 3 is provided for moving the probe devices 2 between the first operating state shown in FIG. 1 and the second operating state shown in FIG. 2. The actuating unit 3 is connected via a connecting means 4 to a control unit 16 positioned externally to the aircraft engine 13 and is controlled by said control unit 16. Using the actuating unit 3, the probe devices 2 are moved to the respectively required operating state and held in the defined positions once the required positions of the actuating unit 3 and of the probe devices 2 have been reached.

In this connection, the term "held" subsumes not only axial guidance of the probe devices 2 but also locking of the probe devices 2 in the respectively required positions of the first and second operating states.

The probe devices 2 are here, in the embodiment of the unit 13 shown in FIG. 1 and FIG. 2, moved mechanically, by gear wheels 11 and by racks 12 meshing with them, between the axial position corresponding to the first operating state and the axial position corresponding to the second operating state of the probe devices 2 and respectively held or locked in said positions. There is a possibility here to drive the gear wheels 11 rotationally by one or more electric motors and to transform the rotational drive via the rack into a translational actuation movement of the probe devices 2. The racks 12 are here connected to the probe device carrier 10 for that purpose.

Alternatively, it is also possible here to axially adjust the probe devices 2 using other electric drives, for example using an electromagnet, or fluidic actuators such as pneumatic or hydraulic piston-cylinder units.

A measuring device 1 has several probe devices 2. In the example shown in FIG. 1 and FIG. 2, six probe devices 2 are arranged in a row approximately parallel to the leading edge of the flow-guiding device 5. The measuring device 1 is arranged in the interior of the flow-guiding device 5.

The probe devices 2 are designed tubular and are fastened to a probe device carrier 10. The probe devices 2 are designed jointly movable with the probe device carrier 10 and are here each designed as a Pitot probe, to permit determination of the impact pressure of the flow S to the required extent.

Alternatively, it is also possible to design the probe devices as a Kiel probe, also termed "Kiel head probe" or "Kiel tube". A Kiel probe substantially includes a Venturi nozzle, in which a Pitot probe is arranged in addition. The Venturi nozzle of a Kiel probe of this type deflects the flow S in the axial direction during the impact pressure measurement and thus ensures a constant flow onto the Pitot probe. The deflection of the flow S in the axial direction makes the measured impact pressure values to a certain degree independent of the pitch angle of the probe devices 2 relative to the flow S.

FIG. 3 shows a further embodiment of the measuring device 1, in which a probe device 2 is firmly connected to a piston unit 9. The piston unit 9 is arranged movable longitudinally or in the axial direction in a cylinder unit 8 designed as a hollow cylinder.

If a first pressure $p\_1$ is applied in the area of a first line L1, the piston unit 9 is moved relative to the cylinder unit 8 such that the probe device 2 increasingly protrudes from the interior of the cylinder unit 8. In addition, a second pressure $p\_2$ can be applied to the piston unit 9 that counteracts the first pressure $p\_1$ in the area of a second line L2. By selective application of the two pressures $p\_1$ and $p\_2$, the probe device 2 can be axially adjusted to any required extent and for example held in the first operating state of the probe device 2 and in the second operating state of the probe device 2 and in the axial positions corresponding to said states.

With further reference to the representations according to FIG. 1 and FIG. 2, the probe devices 2 are adjustable relative to the flow-guiding device 5, regardless of the design of the actuating unit 3, in the manner described in more detail in the following.

In the first operating state shown in FIG. 1, the probe devices 2 are at a distance $x\_2$ from the actuating unit 3 opposite the flow-guiding device 5 with their end areas 2A facing the flow S, from a front area 5A of the flow-guiding device 5 likewise facing the flow S, and at a distance $x\_1$ from the actuating unit 3, and the probe devices 2 each protrude with a defined length into the flow cross-section or bypass flow area of the aircraft engine 13. In this first operating state of the probe devices 2, an impact pressure measurement can be conducted in the area of said probe devices 2.

In contrast to this, the probe devices 2 each have in the positions shown in FIG. 2 their second operating state, in which the end areas 2A of the probe devices 2 close substantially flush with the front area 5A of the flow-guiding device 5. As a result, the distance $x\_1$ between the end area 2A of one of the probe devices 2 facing the flow S and the actuating unit 3, and the distance $x\_2$ between the end area 2A of one of the probe devices 2 facing the flow S and the front area 5A of the flow-guiding device 5, are by definition larger in the first operating state of the probe device 2 than in the second operating state of said probe device 2.

The flush arrangement between the front area 5A of the flow-guiding device 5 and the end areas 2A of the probe devices 2 has the effect that in the second operating state of the probe devices 2 the flow S is not affected by the measuring device 1 and in the so-called retracted operating state of said probe devices 2 an acoustic test of the jet engine 13 can be performed to the required extent without prior removal of the measuring device 1.

The distance value $x\_2$ in the first operating state of the probe devices 2 is selected such that the end areas 2A of the probe devices 2 are not only at a distance from the outer area 5A of the flow-guiding device 5, but additionally also protrude beyond a boundary layer 7 of the flow S forming on the outer circumference of the flow-guiding device 5. The end areas 2A of the probe devices 2 facing the flow S in the flow cross-section are thus outside the boundary layer 7 in the first operating state of said probe devices 2. This ensures that the results of the impact pressure measurement reproduce the pressure conditions actually prevailing in the bypass flow area.

The probe devices 2 of the measuring device 1 can be passed, through openings 6 of the flow-guiding device 5 provided in the front area 5A, out of the interior of the flow-guiding device 5 into the bypass flow area of the aircraft engine 13 and protrude through these openings 6 out of the flow-guiding device 5 in the correspondingly adjusted operating state.

To prevent the flow S from being affected by the openings 6, said openings 6 have a defined diameter d. Above defined diameter values for the openings 6, the flow S is impaired both in the second operating state of the probe devices 2 and in later operation of the aircraft engine 13 with the measuring device 1 removed, which however is unwelcome.

Depending on the respective application, it is also possible that some of the end areas 2A of the probe devices 2 in the second operating state of the probe devices 2, unlike in the flush arrangement, protrude to a minor extent beyond the front area 5A of the flow-guiding device 5 and project at least partially into the boundary layer 7. Furthermore, it can also be provided that some of the end areas 2A of the probe devices 2 facing the flow S are arranged in the interior of the flow-guiding device 5 at a distance from the front area 5A of the flow-guiding device 5.

Regardless of the respective positions of the end areas 2A of the probe devices 2 in the second operating state of said probe devices 2, it must in any event be ensured that the probe devices 2 in their second operating states do not impair or affect the flow S around the flow-guiding device 5, to permit an acoustic test to be conducted to the required extent.

LIST OF REFERENCE NUMERALS

1 Measuring device
2 Probe device
2A End area
3 Actuating unit
4 Connecting means
5 Flow-guiding device
5A Front area of flow-guiding device
6 Opening
7 Boundary layer
8 Cylinder unit
9 Piston unit
10 Probe device carrier
11 Gear wheel
12 Gear rack
13 Unit
14, 15 Component
16 Control unit
d Diameter
L1 First line
L2 Second line
p_1 First pressure
p_2 Second pressure
S Flow
x_1 Distance
x_2 Defined distance value

What is claimed is:

1. A fluid-flow machine, comprising:
a component limiting a flow cross-section;
a flow-guiding device extending into the flow cross-section substantially in a radial direction,
a measuring device arranged at least partially in an interior of the flow-guiding device, the measuring device comprising:
at least one probe device which is at least approximately tubular and by which an operating quantity of at least one chosen from an impact pressure, a total pressure, a dynamic pressure, a temperature and dynamic pressure fluctuations of a flow in the flow-guiding device can be determined,
an actuating unit connected to the at least one probe device for:
axially moving the at least one probe device in a controlled manner in a direction of the flow between a first operating state and a second operating state; and
holding the at least one probe device in at least one state chosen from the first operating state and the second operating state.

2. The fluid-flow machine in accordance with claim 1, wherein distance ($x\_1$) between an end area of the at least one probe device facing the flow and the actuating unit is greater in the first operating state than when the at least one probe device is in the second operating state.

3. The fluid-flow machine in accordance with claim 2, and further comprising an opening passing through an outer area of the flow-guiding device, the at least one probe device positioned in the opening and through which opening the at least one probe device can be moved into the first operating state and into the second operating state.

4. The fluid-flow machine in accordance with claim 3, wherein a diameter of the opening is equal to or smaller than a defined value so that the flow is not affected.

5. The fluid-flow machine in accordance with claim 3, wherein an end area of the at least one probe device facing the flow protrudes, in the first operating state beyond the outer area of the flow-guiding device by a defined distance value ($x\_2$) at which an impact pressure measurement can be conducted, and that the end area of the at least one probe device facing the flow has in the second operating state, a position relative to the outer area of the flow-guiding device in which the flow is not affected by the at least one probe device.

6. The fluid-flow machine in accordance with claim 5, wherein the at least one probe device includes a plurality of probe devices, with the plurality of probe devices being arranged approximately parallel to one another and at a distance from one another over a height of the flow-guiding device.

7. The fluid-flow machine in accordance with claim 6, wherein each of the plurality of probe devices includes an end area facing the flow and the end areas protrude in the first operating state beyond the outer area of the flow-guiding device by an approximately identical distance value ($x\_2$).

8. An aircraft engine comprising the fluid-flow machine in accordance with claim 7, wherein the flow-guiding device is arranged in a bypass flow of the aircraft engine.

9. The fluid-flow machine in accordance with claim 1, wherein the at least one probe device is a Pitot probe.

10. The fluid-flow machine in accordance with claim 1, wherein the at least one probe device is a Kiel probe.

11. The fluid-flow machine in accordance with claim 1, wherein the at least one probe device is movable by the actuating unit by at least one chosen from fluidically, mechanically and electrically between the first operating state and the second operating state.

12. The fluid-flow machine in accordance with claim 1, and further comprising a control unit and a connector connecting the at least one probe device to the control unit.

13. The fluid-flow machine in accordance with claim 1, and further comprising an opening passing through an outer area of the flow-guiding device, the at least one probe device positioned in the opening and through which opening the at least one probe device can be moved into the first operating state and into the second operating state.

14. The fluid-flow machine in accordance with claim 13, wherein an end area of the at least one probe device facing the flow protrudes, in the first operating state beyond the outer area of the flow-guiding device by a defined distance value ($x\_2$) at which an impact pressure measurement can be conducted, and that the end area of the at least one probe device facing the flow has in the second operating state, a position relative to the outer area of the flow-guiding device in which the flow is not affected by the at least one probe device.

15. The fluid-flow machine in accordance with claim 14, wherein the at least one probe device includes a plurality of probe devices, with the plurality of probe devices being arranged approximately parallel to one another and at a distance from one another over a height of the flow-guiding device.

16. The fluid-flow machine in accordance with claim 15, wherein each of the plurality of probe devices includes an end area facing the flow and the end areas protrude in the first operating state beyond the outer area of the flow-guiding device by an approximately identical distance value ($x\_2$).

17. An aircraft engine comprising the fluid-flow machine in accordance with claim 16, wherein the flow-guiding device is arranged in a bypass flow of the aircraft engine.

18. The fluid-flow machine in accordance with claim 1, wherein the at least one probe device includes a plurality of probe devices, with the plurality of probe devices being arranged approximately parallel to one another and at a distance from one another over a height of the flow-guiding device.

19. The fluid-flow machine in accordance with claim 18, wherein each of the plurality of probe devices includes an end area facing the flow and the end areas protrude in the first operating state beyond the outer area of the flow-guiding device by an approximately identical distance value ($x\_2$).

20. An aircraft engine comprising the fluid-flow machine in accordance with claim 1, wherein the flow-guiding device is arranged in a bypass flow of the aircraft engine.

\* \* \* \* \*